United States Patent Office 3,584,114
Patented June 8, 1971

---

3,584,114
FREE-FLOWING POWDERS
Arnold Cavalli, Cedar Grove, and Leon Drekter, Nutley, N.J., assignors to Hoffmann-La Roche Inc., Nutley, N.J.
No Drawing. Filed May 22, 1968, Ser. No. 731,260
Int. Cl. A61k 15/00
U.S. Cl. 424—38
5 Claims

ABSTRACT OF THE DISCLOSURE

There are disclosed methods for producing free flowing, directly compressible compositions from poor flowing powders by mixing the poor flowing powders into melted waxy-like edible materials such as stearic acid, Carbowax, glyceryl monostearate and the like. The thus produced compositions can, if desired, be converted into tablets with excellent properties by direct compression.

BACKGROUND OF THE INVENTION

In recent years a number of significant advances have been made in the field of tablet research, one of the most meaningful of which has been the development of the technique of direct dry compression of flowable tablet material. The simplicity of the direct compression technique results in obvious economic advantage and is advantageous for tabletting materials sensitive to heat or solvents. This technique involves two steps, i.e., (a) mixing of the powder blend and (b) compressing the resulting powder. The wet granulation and dry slug methods, on the other hand, require a multiplicity of steps and increased equipment and manpower investment.

Of the problems inherent in the direct compression technique, two are particularly significant, i.e., (a) not all powders which are desired to be compressed into tablets are directly compressible and (b) many powders which are sought to be used in direct compression techniques have poor flow properties and thus are unsuitable.

In efforts to overcome these problems many adjuvants and excipients have been added to various powders in efforts to modify their compressibility properties and flow characteristics. For example, lubricants, glidants, flow aids, binders, compression aids and the like have been used. Rarely has one adjuvant been found which will satisfactorily modify both the flow characteristics and the compressibility properties of poor flowing powders which are not amenable to direct compression. In the case of compressible poor flowing powders, comparatively large amounts of excipients are needed to improve the flow, bulk density and particle size distribution in order to aid in handling and improve compressibility. There is, therefore, a need for a technique which will improve the flow of poor flowing powders, contribute to the compressibility and binding characteristics of the powders and not require undesirably large amounts of excipients.

SUMMARY OF THE INVENTION

This invention relates to compressible free flowing powders, methods for their preparation and compositions containing them. More particularly, this invention relates to free flowing powders which can be directly compressed and which contain from about 5% to about 30% by weight of a waxy-like edible material.

DETAILED DESCRIPTION OF THE INVENTION

It has been discovered that poor flowing powders intended for compression into tablets can be made free flowing and suitable for direct compression techniques by combining the powder with a waxy-like edible material such as stearic acid, glycerol monostearate, Carbowax and the like. For purposes of this invention, stearic acid is preferred.

This is accomplished by melting the waxy-like material, then adding the powder with stirring until the powder is completely incorporated into the melt. Subsequently, the melt is cooled with stirring, and the product is recovered as a finely divided granular powder. The product is comminuted, if necessary, to a particle size range of which about 75% is larger than 40 mesh and smaller than 16 mesh. As used herein "mesh" refers to a screen mesh of the U.S. Sieve series wherein 40 mesh is 38.02 meshes per linear inch and 16 mesh is 14.66 meshes per linear inch.

The poor flowing powders which are improved according to this invention are those generally used in vitamin compositions. This invention, however, comprehends the improvement of non-vitamin powder compositions which can be used in other applications, e.g., drug, food or feed additives, i.e., corn starch.

The characteristics of the powders treated according to this invention are that they have poor flow properties, are not amenable to direct compression into tablets or are not suitable for use in direct compression processes and have a particle size distribution wherein over 90% is finer than 80 mesh (85.47 meshes per linear inch).

Typical powders are corn starch, multivitamin compositions containing corn starch and/or ferrous sulfate, acorbic acid, calcium pantothenate, vitamin A, niacin or mixtures thereof or similar pharmaceutically acceptable or edible poor flowing, difficult to compress powders. The amount of powder used in conjunction with the waxy-like material depends upon the particular powder treated and the final composition it is in. Generally, from about 65% to about 95% by weight of the powder is incorporated into the composition.

The waxy-like edible materials suitable for use in this invention are those which are normally used as lubricants at about a rate of about 0.5% to about 5% by weight in vitamin or other ingestible compositions. These materials, include, for example, stearic acid, glyceryl monostearate, Carbowax or the like. Preferably stearic acid is used in this invention. However, the term "waxy-like edible material" as used herein comprehends those solid materials which are normally used as lubricants in ingestible compositions and which melt at elevated temperature. The amount of waxy-like material which is effective to improve the flow and compressbility of the treated powders is critical only insofar as a sufficient quantity is used. This quantity varies with the treated powder. Thus, for example, corn starch requires about 25% to about 30% by weight of stearic acid, while ascorbic acid with 2% by weight of corn starch requires about 8% by weight of stearic acid. Multivitamin compositions require varying amounts of stearic acid, e.g., from about 5% to about 20% depending upon the particular formulation.

The method of combining the powders and waxy-like edible material comprises melting the waxy-like material, adding the powder to it or, alternatively, pouring the melted waxy-like material into the powder, the former method being preferred. The melt is then cooled while mixing and the resulting granular powder recovered. If needed, the powder is subsequently comminuted to reduce the particle size to about 75% larger than 40 mesh and finer than 16 mesh. It is critical to the successful operation of this invention that the waxy-like material be melted prior to combination with the poor flowing powder.

The waxy-like material besides acting as a lubricant and glidant, coats conglomerates of the treated powder forming a granular material, thus effectively increasing the particle size of the powder and improving its flowing and compression properties.

The following examples illustrate the invention which is not intended to be limited thereto.

EXAMPLE 1

B complex—iron tablets (a) The following formulation is used:

| | Parts by wt. |
|---|---|
| Ferrous sulfate exsiccated | 168.00 |
| Thiamine mononitrate crystals | 5.75 |
| Riboflavin—fine powder | 5.50 |
| 90% vitamin C—granulation | 96.00 |
| Niacinamide—dense grade | 31.50 |
| Calcium pantothenate | 3.00 |
| Pyridoxine HCl | 0.55 |
| Vitmain $B_{12}$ in gelatin (0.1%) | 3.75 |
| Inositol | 20.00 |
| Methionine | 25.00 |
| Choline bitartrate | 25.00 |
| Brewer's yeast—granular | 50.00 |
| Corn starch | 33.00 |
| Lactose | 33.00 |
| Stearic acid | 40.00 |

The stearic acid is melted, then the ferrous sulfate is added with stirring until the mixture becomes uniform. The riboflavin, niacinamide, calcium pantothenate, Brewer's yeast and corn starch are then added with stirring until the mixture is uniform. The remaining ingredients are added with mixing. The resulting granular powder, which has excellent flow, is compressed in a conventional tabletting machine to form hard tablets.

(b) Using the same formulation but adding the stearic acid as a powder results in a powder which has poor flow characteristics and is unsuitable for direct compression.

EXAMPLE 2

Multivitamin tablet

The following formulation is used:

| | Parts of wt. |
|---|---|
| Thiamine mononitrate crystals | 1.5 |
| Riboflavin—fine powder | 1.8 |
| Pyridoxine HCl | 2.2 |
| Vitamin $B_{12}$ in gelatin (0.1%) | 3.4 |
| Niacinamide—dense grade | 23.1 |
| Folic acid | 0.6 |
| Calcium pantothenate | 3.2 |
| Vitamin A acetate 500 I.U./gm. | 13.0 |
| Vitamin $D_2$ 850 I.U./gm. | 0.5 |
| Vitamin C | 77.0 |
| Corn starch | 69.2 |
| Stearic acid | 34.5 |

The stearic acid is melted and the remaining ingredients are added to it with stirring until a granular powder forms. The resulting granular powder is free flowing and is formed into suitable tablets by direct compression in a conventional tabletting machine.

EXAMPLE 3

The following formulation is used:

| | Parts by wt. |
|---|---|
| Ascorbic acid | 90 |
| Stearic acid | 8 |
| Corn starch | 2 |

The stearic acid is melted and the remaining ingredients are added to it with stirring until a granular powder forms. The resulting granular powder is free flowing and is formed into suitable tablets by direct compression on a conventional tabletting machine.

EXAMPLE 4

The following formulation is used:

| | Parts by wt. |
|---|---|
| Corn starch | 71.5 |
| Stearic acid | 28.5 |

The stearic acid is melted and the corn starch is added with stirring until a granular powder forms. The resulting granular powder is free flowing and is formed into suitable tablets by direct compression on a conventional tabletting machine.

What is claimed is:

1. A method of directly compressing tablets of an edible, poorly flowing vitamin or non-vitamin drug, food or feed additive powder having a particle size distribution wherein over 90% are finer then 80 mesh, which comprises combining the powder with from about 5% to about 30% by weight of melt of stearic acid as the sole essential direct compression tabletting adjuvant which acts as a lubricant and glidant and coats conglomerates of the powder, thereby effectively increasing the particle size of the powder, forming a granular material, cooling the melt with stirring until a finely divided granular powder is recovered, comminuting the product to a particle size range of which about 75% are larger than 40 mesh and finer than 16 mesh and directly compressing tablets therefrom.

2. A directly compressed tablet produced by the process of claim 1, comprising from about 5% to about 30% by weight of stearic acid in combination with said poor flowing, edible vitamin or non-vitamin drug, food or feed additive powder.

3. The directly compressed tablet of claim 2 wherein the poor flowing powder is ascorbic acid.

4. The directly compressed tablet of claim 2 wherein the poor flowing powder is a multivitamin composition.

5. The directly compressed tablet of claim 2 wherein the poor flowing powder is corn starch.

References Cited

UNITED STATES PATENTS

| 3,037,911 | 6/1962 | Stoyle et al. | 424—280X |
| 3,308,217 | 3/1967 | Lowy et al. | 264—117 |

SHEP K. ROSE, Primary Examiner

U.S. Cl. X.R.

424—252, 319, 237, 344, 280, 147, 201, 255, 263, 266; 99—2, 11, 94, 166; 117—100; 264—117